(12) United States Patent
Butterfield

(10) Patent No.: US 7,404,778 B2
(45) Date of Patent: *Jul. 29, 2008

(54) HIGH-PERFORMANCE SILENT CHAIN

(75) Inventor: Roger P. Butterfield, Trumansburg, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/689,539

(22) Filed: Mar. 22, 2007

(65) Prior Publication Data

US 2007/0287563 A1    Dec. 13, 2007

Related U.S. Application Data

(63) Continuation of application No. 10/895,151, filed on Jul. 20, 2004, now abandoned, which is a continuation-in-part of application No. 10/650,539, filed on Aug. 28, 2003, now Pat. No. 7,056,248.

(51) Int. Cl.
    *F16G 13/04* (2006.01)

(52) U.S. Cl. .................................... 474/212; 474/230

(58) Field of Classification Search ......... 474/210–217, 474/226–229, 230, 224, 201–202
    See application file for complete search history.

(56) References Cited

U.S. PATENT DOCUMENTS

| | | | |
|---|---|---|---|
| 953,114 A | 3/1910 | Belcher | |
| 1,586,857 A | 6/1926 | Stiansen | |
| 1,658,602 A | 2/1928 | Koelkebeck | |
| 1,945,357 A * | 1/1934 | Pierce | 474/210 |
| 1,952,885 A | 3/1934 | Oakes | |
| 1,956,942 A | 5/1934 | Belcher et al. | |
| 2,047,833 A * | 7/1936 | Pierce | 474/217 |
| 2,277,915 A * | 3/1942 | Klaucke | 474/210 |
| 2,466,639 A | 4/1949 | Focke et al. | |
| 2,498,788 A * | 2/1950 | Bremer | 474/228 |
| 2,667,791 A | 2/1954 | Bremer | |
| 3,153,348 A * | 10/1964 | Kuntzmann | 474/231 |
| 3,661,025 A * | 5/1972 | Avramidis | 474/217 |
| 4,117,738 A | 10/1978 | McKeon | |
| 4,463,550 A | 8/1984 | Avramidis | |
| 4,906,224 A | 3/1990 | Reber | |
| 5,176,587 A | 1/1993 | Mott | |
| 5,382,199 A | 1/1995 | Ducharme | |
| 5,464,374 A * | 11/1995 | Mott | 474/224 |
| 5,690,571 A | 11/1997 | Mott | |
| 5,800,301 A | 9/1998 | Anderson | |
| 5,989,141 A | 11/1999 | Kozakura et al. | |
| 6,393,820 B1 | 5/2002 | Varnam et al. | |
| 6,450,911 B2 | 9/2002 | Saitou | |

(Continued)

*Primary Examiner*—Robert A. Siconolfi
*Assistant Examiner*—James K Hsiao
(74) *Attorney, Agent, or Firm*—Brown & Michaels, PC

(57) ABSTRACT

A hybrid roller/silent chain of the present invention has the wear resistance of a roller chain combined with the noise performance of a silent chain. This is accomplished with the use of transverse load-bearing elements that allow increased bearing area for the articulating members of the chain by allowing load to be transmitted through both the inside and outside diameter of the element in the same plane. In some embodiments, the transverse load-bearing elements are bushings. In other embodiments, the elements are projections extending from non-guide row inside links.

13 Claims, 13 Drawing Sheets

U.S. PATENT DOCUMENTS 6,485,385 B2 11/2002 Shimaya
6,733,410 B2 5/2004 Saito
7,108,622 B2 9/2006 Okabe

* cited by examiner

PRIOR ART

PRIOR ART

HIGH-PERFORMANCE SILENT CHAIN

REFERENCE TO RELATED APPLICATIONS

This application is a continuation of application Ser. No. 10/895,151, filed Jul. 20, 2004 now abandoned, entitled "HIGH-PERFORMANCE SILENT CHAIN", which is a continuation-in-part application of application Ser. No. 10/650,539, filed Aug. 28, 2003, entitled "IMPROVED SILENT CHAIN", which is now U.S. Pat. No. 7,056,248. The aforementioned applications are hereby incorporated herein by reference.

BACKGROUND OF THE INVENTION

1. Field of the Invention

The invention pertains to the field of silent chains. More particularly, the invention pertains to an improvement over a commonly available silent chain. Yet more particularly, the invention pertains to an improvement over a commonly available silent chain having transverse load-bearing elements that permit increased bearing area for articulating members of the chain.

2. Description of Related Art

Roller chains and silent chains are known in the art. Both types of chains have known applications in the automobile industry.

U.S. Pat. No. 6,450,911 teaches a peripheral surface of a silent chain including a number of interleaved rows of link plates articulately connected together by joint pins. Each of the link plates has a pair of teeth and a pair of pin holes. The link plate further has a tubular portion protruding continuously from one surface of the link plate and defining a peripheral surface of each of the pin holes. The tubular portion has a height substantially equal to the thickness of the link plate. The tubular portion increases the contact area between the plate and the joint pin and thus suppresses wear on the joint pin. Further, the tubular portion allows the plate to retain sufficient rigidity and strength without narrowing the web width between each pin hole and the outside flank or the inside flank of the corresponding tooth. The silent chain as a whole is relatively light in weight. The peripheral surface of U.S. Pat. No. 6,450,911, however, has disadvantages including increased width of each strand of chain. Further, it would inherently require more elaborate manufacturing procedure to produce the chain links.

U.S. Pat. No. 6,485,385 teaches three structural components jointly constituting a single guide link of a silent chain. Two guide plates, at least one guide link plate disposed between the guide plates, and two round connector pins press-fitted in the guide plates are constructed to satisfy the expression $(P_m + D_m - D_p') - P_g' = 0$. $P_m$ is the link plate pitch represented by the distance between pin hole centers in the guide link plate. $D_m$ is the inside diameter of the pin holes in the guide link plate. $D_p'$ is the outside diameter between the round connector pins press-fitted in each guide plate. $P_g'$ is the post-press-fitting guide plate pitch represented by the distance between pin hole centers in each guide plate press-fitted with the round connector pins. In the assembled silent chain, each round connector pin extends has its outer peripheral surface in contact with the inner peripheral surface of the mating pin hole of the guide link plate and articular links. The articular links move relative to the pin and create the bearing area. The pin outer peripheral surface being in contact with the inner peripheral surface of the mating pin hole of the guide link plate and the articular links, however, has disadvantages, including the restriction of the bearing surface area to the above-described contact.

The chain industry is continually searching for better performance in silent chains. There is a need in the art for a silent chain with an increased contact or bearing surface of the articulating components of a chain.

A cross sectional view of a bush type roller chain is shown in FIG. 1. Roller chains typically have very good wear properties due to the full length bearing between the pin (14) and the bushing (12). As the pin (14) rotates within the bushing (12), the pin (14) is well supported along the entire length of the bushing (12). The close fit between the pin (14) and bushing (12) provides good wear resistance. The roller chain further includes two types of links (16) and links (18). One type (16) is known as a bush row link. The other type of link (18) is known as a pin row link.

Noise generated by chain drives comes from a variety of sources. In roller chain drives, the noise is caused, in part, by the impact between the chain and the sprocket at the onset of meshing. The loudness or the noise level of the impact is affected by, among other things, the impact velocity between the chain and the sprocket engaging the chain. The mass of chain rollers contacting the sprocket at a particular moment or time increment affects the noise level as well.

Much effort has been made to decrease the overall noise level and pitch frequency noise distribution in automotive chain drives thereby to minimize the objectionable effects of the pure sonic tones. Silent chains are typically used in automotive applications where noise generation is to be minimized. Modifications of the link flank shape and profile are known to reduce noise levels significantly.

Roller chains are used in automotive applications. Roller chains are usually limited, however, to applications where noise generation is not of a primary concern. Roller chains are characterized by the resistance to wear exhibited by their components.

A typical silent chain is shown in FIG. 2A and FIG. 2B. The silent chain includes guide link rows and non-guide link rows alternately connected together in an endless fashion. Typically, the guide link rows each have a pair of guide plates (15) and at least one inside link plate (13) disposed between the guide plates. The guide plates (15) and the inside link plate (13) each have a pair of pin holes or apertures (19) spaced in the direction of travel of the silent chain. The non-guide link rows typically have two or more inside link plates (11). The non-guide row inside link plates (11), like the guide plates (15) and the guide row inside link plates (13), each have a pair of spaced pin holes (19). The guide plates (15), the guide row inside link plates (13) and the non-guide row inside link plates (11) are articulately connected together by a connector pin (17) inserted through the laterally-aligned pin holes (19) of the non-guide row inside link plates (11) and guide row inside link plates (13). The connector pin (17) may be a round pin or a pair of rocker joint pins.

Silent chains generally have poor wear performance due to the relatively short and poor-quality bearing area between the non-guide row inside link plates and the pin. The available bearing length is significantly less than in a roller chain having the same total width. Further, in silent chains, the bearing surface is typically made up of several inside link apertures, rather than the continuous bushing bore used in a roller chain.

One exemplified usage of a silent chain is in transmitting power between a driving sprocket and a driven sprocket through the meshing engagement of the chain with the sprockets. By way of a practical example, the silent chain is wound around a crankshaft sprocket and a camshaft sprocket of an automobile engine, or around the sprockets of a transfer unit. When the silent chain starts to mesh with the sprocket, noises occur due to such occurrences as collision between the flank surface of each link plate and the tooth flank of the sprocket.

One of the known advantages of a silent chain is the improved NVH (noise-vibration-harshness) characteristics due to the engagement of the silent chain tooth flank on the sprocket. On the other hand, roller chains have their own advantageous characteristics as well, as discussed previously. As can be appreciated, it is desirable to combine the useful characteristics of a roller chain and a silent chain in a unique manner to provide an improved silent chain, so that the wear characteristics of a roller chain and the NVH characteristics of a silent chain are combined. Further, it is desirable to provide superior wear characteristics to a roller chain by providing increased total bearing area between the articulating components of the chain.

SUMMARY OF THE INVENTION

An improved silent chain having better wear properties than a roller chain and much better wear properties than a conventional silent chain is provided. An improved silent chain possessing noise-vibration-harshness (NVH) characteristics of a conventional silent chain is provided. An improved silent chain having a similar weight to a conventional silent chain is provided.

A chain of the present invention includes a plurality of links. Each link includes a pair of link apertures, and each link aperture has an aperture diameter and an inner aperture surface. The chain also includes a plurality of transverse load-bearing elements. Each element includes an outer element surface, having an outer element diameter, and an element aperture, having an inner element surface and an inner element diameter. Each element passes through at least one link aperture. The chain also includes a plurality of cylindrical pins. Each pin includes an outer pin surface and an outer pin diameter and passes through at least one link aperture and through at least one element aperture. The outer pin diameters are less than the inner element diameters, such that the outer pin surface is moveable relative to the inner element surface. The aperture diameter of at least one link is larger than the outer element diameters, such that the outer element surface is moveable relative to the inner aperture surface of the link. The arrangement is such that the outer pin surface bears and articulates against the inner element surface, and the inner aperture surface, through which the element passes, bears and articulates against the outer element surface. The use of both the inner element surface and the outer element surface to carry a load in a plane of the links allows an increased bearing area for a given chain width.

In an embodiment of the present invention, the plurality of links further include a plurality of first links, a plurality of second links, and a plurality of outside links. Each transverse load-bearing element passes through at least one second link aperture. Each pin passes through at least one outside link aperture. The links are arranged in rows, alternating between a first row comprising at least one first link and a second row comprising at least one outside link on each edge of the chain and at least one second link. The first links and the transverse load-bearing elements are fixed such that no relative movement occurs between the first link and the transverse load-bearing element. The second link aperture diameters are larger than the outer element diameters such that the outer element surface is moveable relative to the second link inner aperture surface. The outside link aperture diameters and the pin diameters are tightly fit such that no relative movement occurs between the outside link inner aperture surface and the outer pin surface. The arrangement is such that the chain is made up of alternating first rows of first links rigidly affixed to the transverse load-bearing elements and second rows of second links movable on the transverse load-bearing elements and outside links affixed to the pins, wherein the first rows and second rows are articulately connected together along a direction of travel.

The first rows are preferably non-guide rows. The first links are preferably inverted-tooth type links. The outside links are preferably inverted-tooth type links. The outside links are preferably guide links. The second links are preferably inverted-tooth type links. In some embodiments, the second links are positioned along a centerline of the chain. In one of the embodiments of the present invention, the second links are non-inverted center guide links.

In some embodiments of the present invention, the transverse load-bearing elements are bushings. In other embodiments, the first links further include a first link body including a pair of first link apertures. Each first link aperture has a first link aperture diameter and a first link inner aperture surface. The first links further include the transverse load-bearing elements, where each element includes a pair of projections. Each projection extends laterally from the first link body at each first link aperture, thereby increasing the width of the first link inner aperture surface, and comprising an outer projection diameter and an outer projection surface.

Different embodiments of the present invention have different lacings of the links. In some embodiments, each pin passes through links in a sequential order of an outside link, at least one first link, at least one second link, at least one first link, and an outside link. In one embodiment, each at least one first link in the sequential order includes two first links. In one embodiment, the at least one second link in the sequential order includes two second links. In one embodiment, each at least one first link in the sequential order includes two first links and the at least one second link in the sequential order includes two second links. In other embodiments of the present invention, the sequential order further include a third link between the two second links, where the third link is in the first row and is a non-inverted link.

In other embodiments, the inner element surface is discontinuous on each pin, such that each pin passes through two transverse load-bearing elements. In one embodiment, each pin passes through links in a sequential order of an outside link, at least one first link, at least one second link, at least one first link, at least one outside link, at least one first link, at least one second link, at least one first link, and an outside link. In another embodiment, the two transverse load-bearing elements are separated on the pin by the at least one outside link.

In other embodiments of the present invention, the two transverse load-bearing elements are separated by at least one third link, each third link being in the second row and including a pair of third link apertures, where each third link aperture has a third link aperture diameter and a third link inner aperture surface. In one of these embodiments, the third link aperture diameters are larger than the pin diameters such that the outer pin surface is moveable relative to the third link inner aperture surface. In another embodiment, the third link aperture diameters and the pin diameters are tightly fit such that no relative movement occurs between the third link inner aperture surface and the outer pin surface. In one embodiment, each pin passes through links in a sequential order of an outside link, at least one first link, at least one second link, at least one first link, at least one third link, at least one first link, at least one second link, at least one first link, and an outside link. In another embodiment, each pin passes through links in a sequential order of an outside link, at least one first link, at least one second link, at least one first link, at least one second link, at least one first link, at least one second link, at least one first link, and an outside link. In another embodiment, each at least one second link in the sequential order comprises two second links.

DETAILED DESCRIPTION OF THE INVENTION

The present invention combines characteristics of prior art roller chains and silent chains in a unique manner in that the wear characteristics of a roller chain and the NVH characteristics of a silent chain are combined into an inventive whole. The combined whole of the present invention provides increased total bearing area between articulating components of the chain, thereby providing superior wear characteristics to a roller chain. In all embodiments of the present invention, an outer surface and an inner surface of a transverse load-bearing element are used to increase the load-bearing area for a given chain width. In the first set of embodiments, the load-bearing elements include bushings. In the second set of embodiments, the load-bearing elements include projections on the non-guide row inside links.

Figure 1:
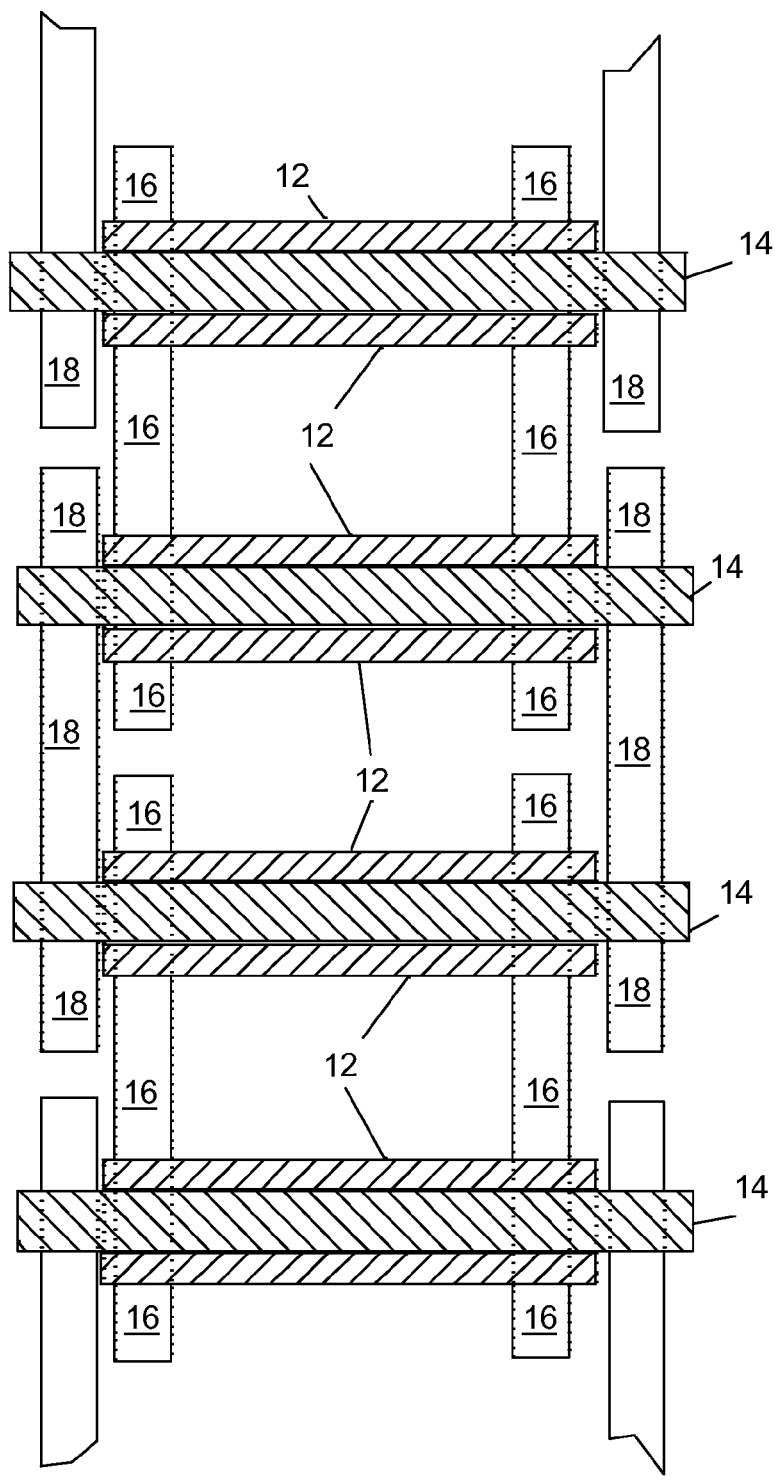
FIG. 1 shows a cross-sectional view of a prior art bush type roller chain.
Figure 2A:
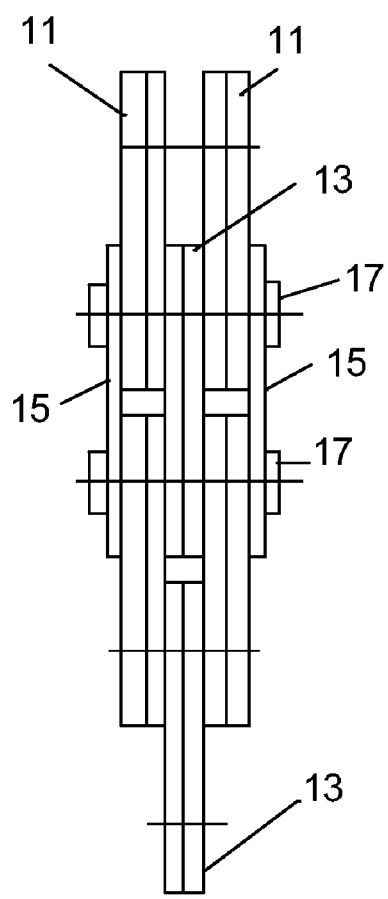
FIG. 2A shows a top view of a typical prior art silent chain.
Figure 2B:
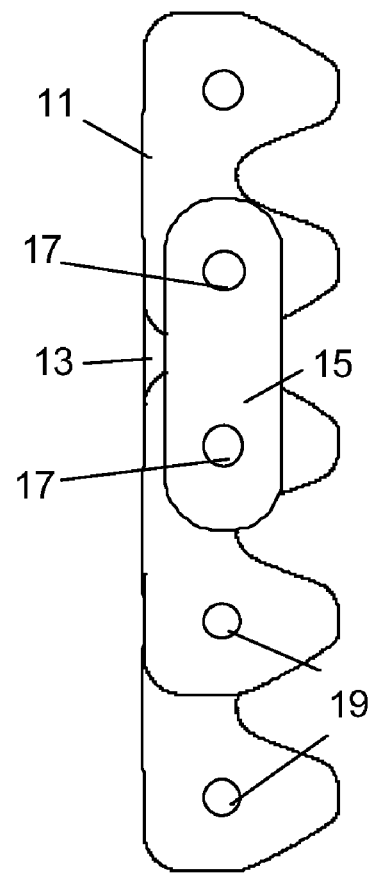
FIG. 2B shows a side view of the prior art silent chain of FIG. 2A.
Figure 3:
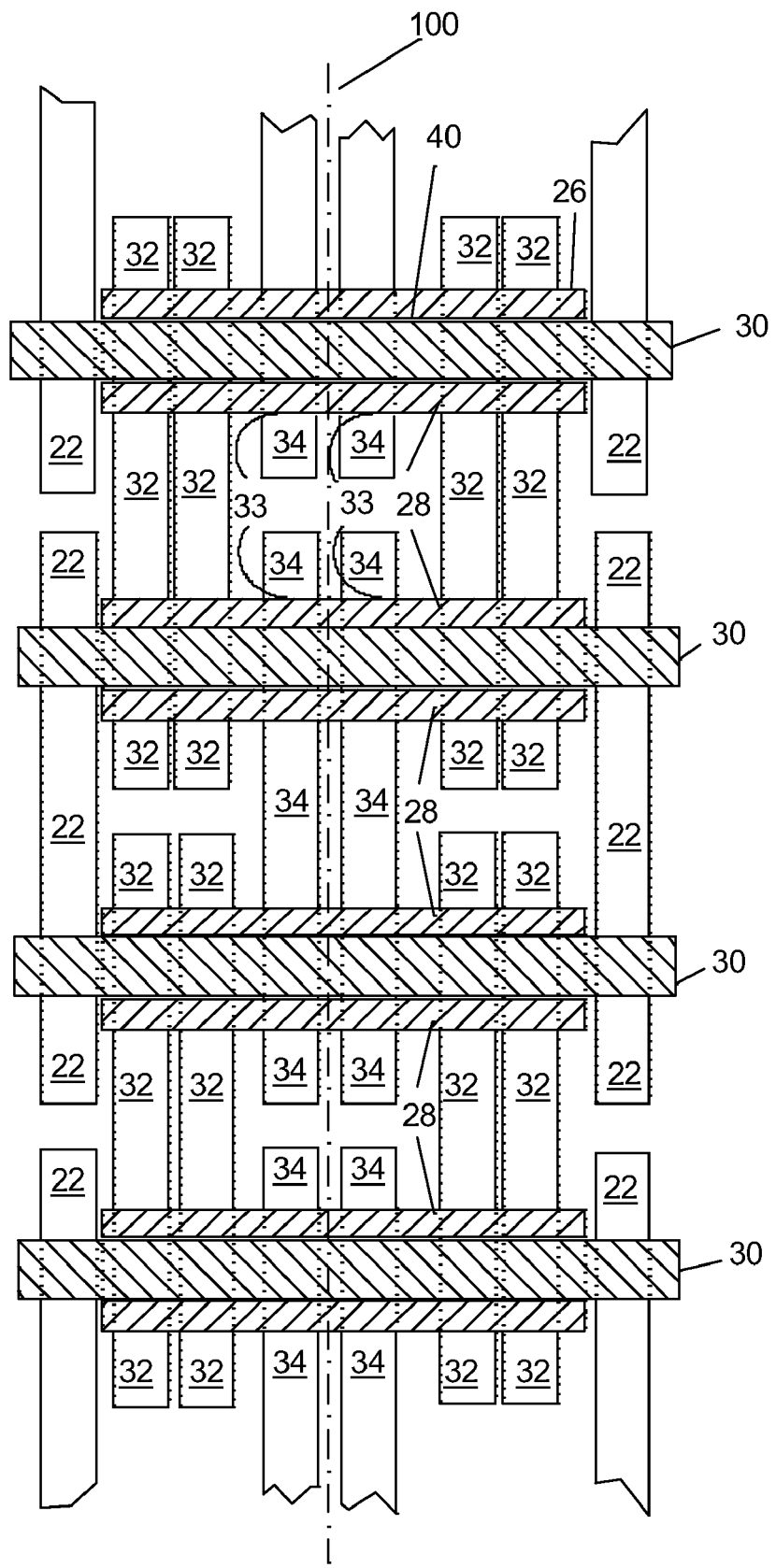
FIG. 3 shows a cross-sectional view of an embodiment of the present invention.

An embodiment of the present invention, which discloses the fundamental concept is shown in FIG. 3. In this embodiment, two pairs of inside links (32) on the non-guide row are provided. Two inside links (34) on the guide row are also provided. Additionally, a pair of outside guide links (22) are provided. The guide row inside links (34) are located in the center of the endless chain having a center line (100) partitioning the two links (34). The center line (100) also partitions the guide links (22) and non-guide row inside links (32).

In FIG. 3, the chain is guided on a sprocket (not shown) by the pair of outside guide links (22). Each link including the guide links (22) has a pair of apertures or annular openings at each end. Within each aperture, there is a surface. Further, each aperture receives a connecting member such as a pin (30), or a bushing (28), for connecting various links to an endless chain. Each non-guide row inside link (32) has a pair of apertures or annular openings at each end. Within each aperture of these links (32), there is a surface press fit over a bushing (28), such that no relative movement therebetween occurs. Each guide row inside link (34) has a pair of apertures or annular openings at each end. Within each aperture of these links (34), there is a surface (33) used as a bearing area over the bushing (28) in which relative movement therebetween occurs.

FIG. 3 is illustrative of some of the concepts of the present invention in that a set of transverse load-bearing elements (28) is interposed between some of the links and the pins (30). In FIG. 3, the transverse load-bearing elements are bushings (28). Specifically, the non-guide row (32) and the guide row inside links (34) have bushings (28) interposed between their apertures and a pin (30). Each bushing (28) includes an outside surface (26) and an inside surface (40). The outside surface (26) is defined by a set of points distributed on the O.D. (outside diameter) of the bushing (28). The inside surface (40) is defined by a set of points distributed on the I.D. (inside diameter) of the bushing (28). Two links (34) are provided across the chain in this embodiment. In each aperture of these links (34), an inside surface is defined as a bearing area (33), which comes in contact with the outside surface (26) of its bushing (28). This contact is not rigidly affixed and allows relative movement of the two contacting surfaces. An additional four links (32) across the chain are provided in the non-guide rows, which are interposed between guide row links (34) and outside guide links (22). Both the guide row (34) and the non-guide row links (32) are of the inverted tooth type. However, each aperture of the non-guide row links (32) is rigidly affixed upon the outside surface (26) of the bushing (28) that comes in contact therewith.

As can be appreciated, the present invention provides links (34) which possess apertures with inner surfaces that fit over the outside surface (26) of the bushings (28), thereby providing additional bearing area to carry load for the chain assembly as a whole. The total bearing area of the present invention is the sum of the pin (30) to bushing (28) bearing area, which is the area disposed for contact between an inner surface (40) of a bushing (28) and an outer surface of a pin (30), and the bushing (28) to link (34) bearing area (33), which is the area disposed for contact between an outer surface (26) of a bushing (28) and an inner surface of the annular openings of a link (34). By allowing part of the tensile load in the chain to be carried by the pin (30) to bushing (28) interface, and the remainder of the tensile load to be carried by the link (34) to bushing (28) outside diameter (O.D.) interface, the net unit load between the pin (30) and the bushing (28) is reduced, when compared to a conventional roller chain, thereby causing reduced wear of the relevant portions of the resultant endless chain. The torque-transmitting contact between the chain and sprocket is through the inverted tooth links (32) and (34), thereby providing the NVH performance of a silent chain.

Figure 4:
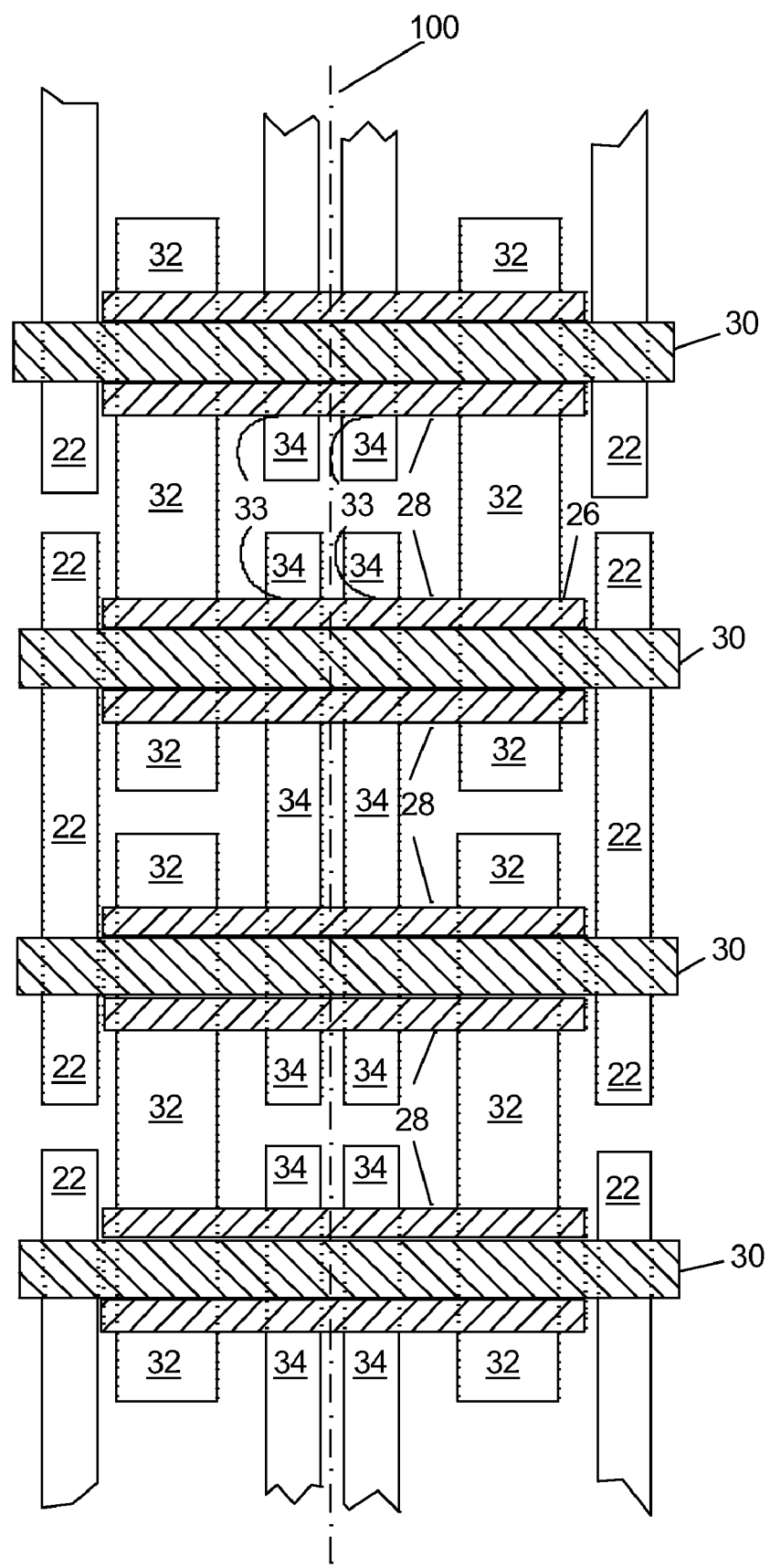
FIG. 4 shows a cross-sectional view of another embodiment of the present invention.

A second embodiment is shown in FIG. 4. Similar to FIG. 3, an endless chain having links (22), (32), and (34) is provided. Bushings (28) and pins (30) are provided as well. In this embodiment, only two links (32) are used in the non-guide rows. Each non-guide row link (32) is interposed between an outside guide link (22) and a guide row link (34). The pairs of links are substantially symmetrical with respect to the center line (100) of the chain.

Figure 5A:
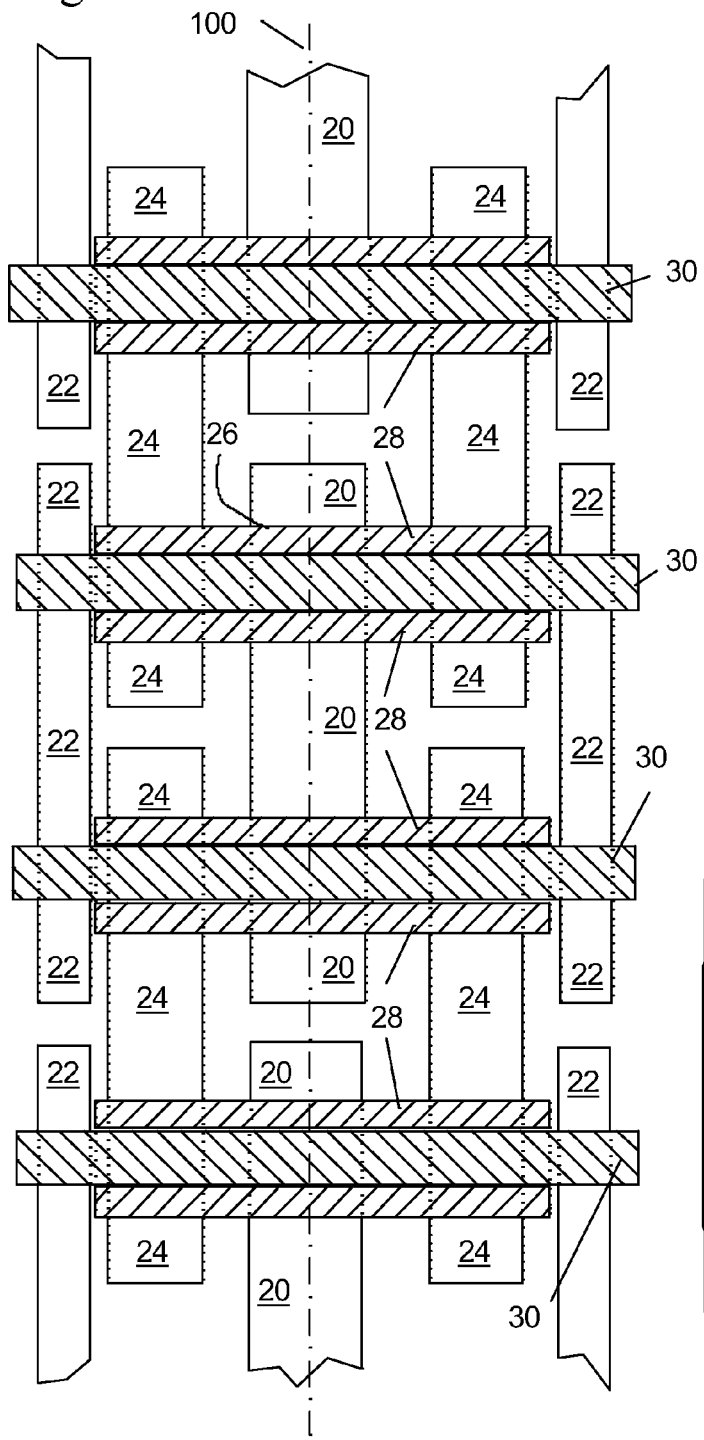
FIG. 5A shows a cross-sectional view of another embodiment of the present invention.
Figure 5B:
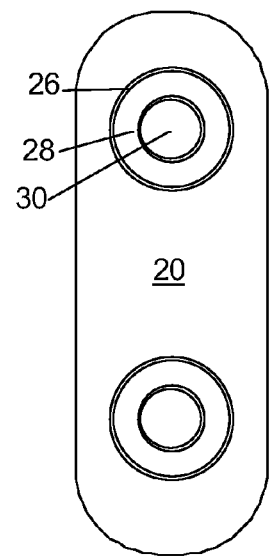
FIGS. 5B shows a side view of a guide link of FIG. 5A.
Figure 5C:
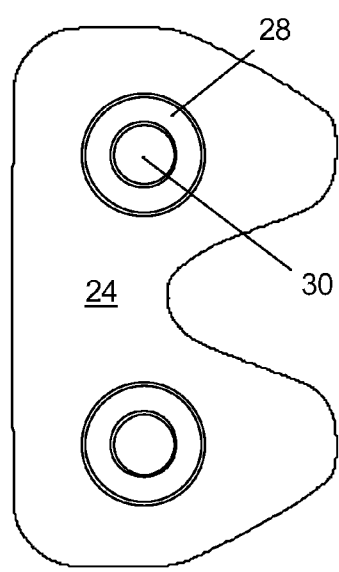
FIGS. 5C shows a side view of a toothed link of FIG. 5A.

Referring to FIG. 5A through 5C, a third embodiment of the present invention is shown. In this embodiment, the endless chain is similarly guided on the sprocket (not shown) by a center link (20) on the guide row, which fits into a groove (also not shown) of the sprockets. The center link (20) is non-inverted in shape as shown in FIG. 5B. The remaining links of this embodiment are of the inverted tooth type. The inside link (24) of FIG. 5A and FIG. 5C is functionally the same as, but wider than in most cases, the non-guide links (32) shown in other embodiments. The inside link (24) is rigidly affixed upon the bushing (28). For example, the link (24) may be press fit onto the bushing (28). Therefore, no relative movement between the O.D. of the bushing (28) and the inside surface of the link (24) occurs. The use of a center guide link in silent chains is well known in the art, but the present invention provides for the center guide link (20) to fit over the outside surface (26) of the bushing (28), thereby providing additional bearing area to carry load. The total bearing area of this design is the sum of the pin (30) to bushing (28) bearing area, which is the area disposed for contact between the inner surface (40) of the bushing (28) and the outer surface of the pin (30), and the bushing (28) to link (20) bearing area, which is the area disposed for contact between the outer surface (26) of bushing (28) and the inner surface of the apertures of the center link guide (20). By carrying part of the tensile load at the pin (30) to bushing (28) interface and the remainder of the tensile load at the center guide link (20) to bushing (28) outside diameter (O.D.) interface, the chain experiences a reduced net unit load between the pin (30) and bushing (28), thereby causing reduced wear of the relevant portions of the chain. The torque transmitting contact between the chain and sprocket is through the links (22) and (24), which are of the inverted tooth type, thereby providing the NVH performance of a silent chain.

Figure 6:
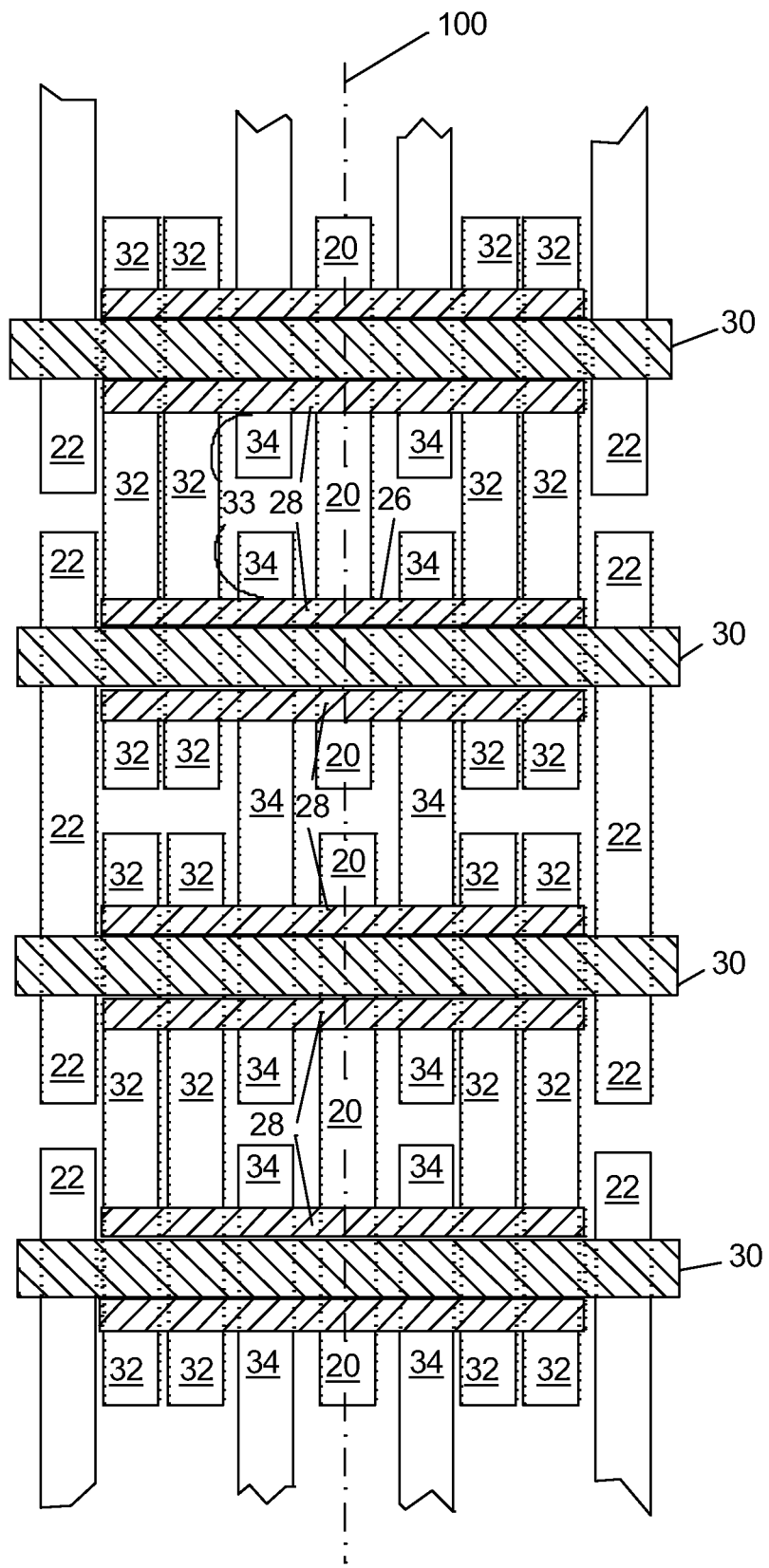
FIG. 6 shows a cross-sectional view of another embodiment of the present invention.

A fourth embodiment is shown in FIG. 6. This embodiment includes a wider chain having more linking elements. A single center guide link (20) is provided along the center line (100), in the first row. Furthermore, two pairs of parallel inside links (32) are provided for higher strength. In this case, the center guide link (20), and the inside links (32) do not move relative to the bushing (28) O.D. A bearing area (33) is provided in which the guide row links (34) possess an inside aperture surface which articulates relative to the bushing (28) O.D. The apertures of these links (34) bear against the O.D. of the bushing (28). Again, the pin (30) has a full bearing area within the inner diameter (I.D.) of the bushing (28). As in the previous embodiments, an additional bearing area between the articulating members is provided by utilizing the O.D. of the bushing (28) for bearing contact with one or more links (34) in the guide row. The links (22), (32), and (34) are of the inverted tooth type, and mesh with the sprocket teeth, thereby providing the NVH performance of a silent chain.

It is noted that in any of the above embodiments, the provision of additional links that bear against the O.D. of the bushing reduces the load carried by the pin (30), as compared to roller chains. The reduction of the load carried by the pin (30) reduces the wear between the pin (30) and the bushing (28), resulting in a design that has superior wear performance compared to a roller chain, while providing the NVH performance of a silent chain, by utilizing inverted tooth type links to contact the sprocket.

In operation, if there is any imbalance in the load sharing between links, the components tend to wear in and improve the load sharing. For example, if the outside link (22) is carrying more than the ideal load, the pin (30) initially wears more quickly, causing the center link or other links (34) or (20) in the same row to carry increased load, until a natural balance is achieved. This natural tendency to "wear-in" to a balanced situation helps to reduce the impact of dimensional tolerances on the performance of the chain.

Figure 7:
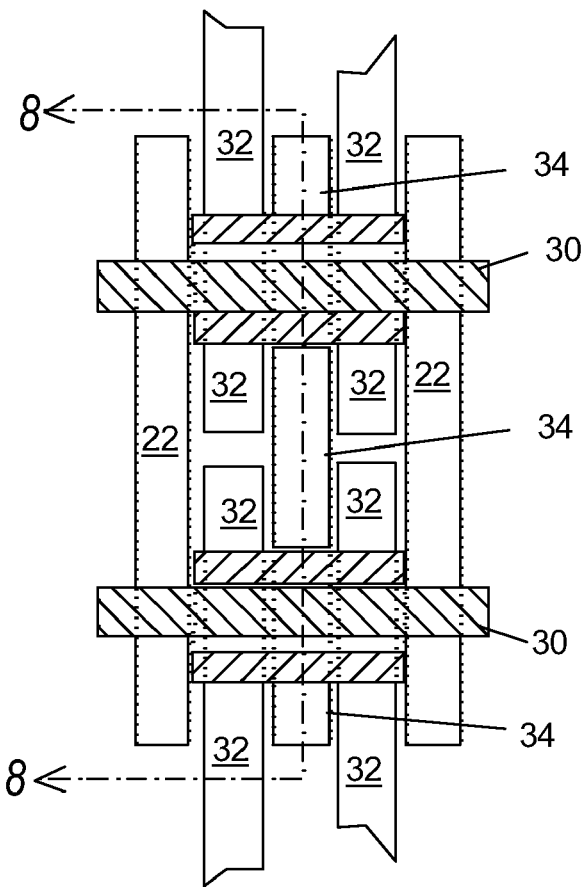
FIG. 7 shows a cross-sectional view of an embodiment of the invention using both inside and outside surfaces of the bushings as bearing areas.

A multiplicity of embodiments for this invention exists. The embodiment of the present invention shown in FIG. 7 and FIG. 8 uses both the inside surface (40) and the outside surface (26) of the bushing (28) to carry load, providing large bearing area for wear resistance while allowing the use of silent chain links (32) and (34) for NVH. The chain provides at least as much bearing area as a roller chain. The load is transmitted to both the inside (40) and outside (26) surfaces of the bushing (28), thereby distributing the load. Further, the present invention allows for increased amounts of bearing area in a relatively limited chain width. The above is shown FIG. 7, which shows a section of a chain using the links of FIG. 8, and in FIG. 8, which is an exaggerated side view cross-section of a chain incorporating an embodiment of the present invention.

Figure 8:
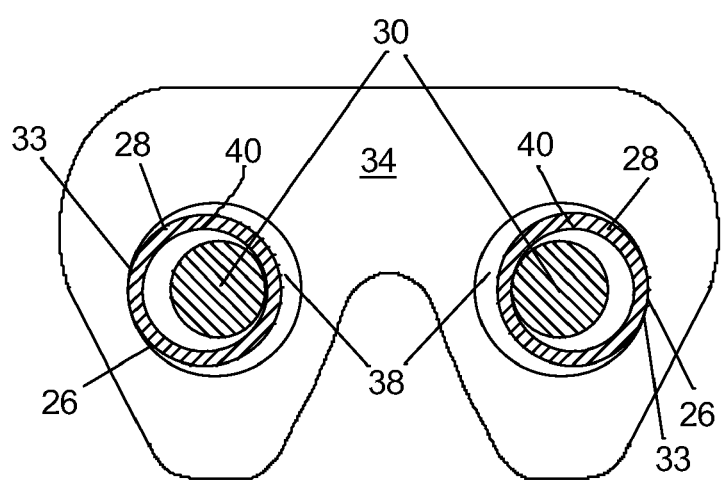
FIG. 8 shows a side view of a chain link with a cut-away view of a pin and bushing, along the section line 8-8 in FIG. 7.

Referring to FIG. 8, which is an exaggerated partial side view of a chain incorporating an embodiment of the present invention, a link forming part of an endless chain such as the guide row link (34) is shown. The link (34) has a pair of apertures (38). Each aperture (38) possesses a bearing area (33), which comes in contact with the bushing (28) at its outside surface (26). The pin (30) comes in contact with the inside surface (40) of the bushing (26). As can be appreciated, the bearing area (33) increases the total bearing area in order to share the load of the endless chain.

More specifically, referring to the section shown in FIG. 8, the outside surfaces of the pins bear against the inside surfaces of the bushings and articulate against them. The inside surfaces of the apertures in the guide row inside links (34) bear against the outside surfaces of the bushings, and articulate against them. This use of both inside surface and outside surface of the bushing in the same plane to carry load allows increased bearing area for a given chain width.

In any of these embodiments, the thickness and number of the various links can be adjusted to optimize the strength and the wear resistance of the chain. The diameters of the pin, bushing I.D., and bushing O.D. can also be optimized to provide the best combination of strength and wear resistance. By providing maximum total bearing area between the articulating members of the chain, the wear resistance is optimized.

The present invention is an improvement over a roller chain in that it has reduced wear by providing a new bearing surface between the outside of the bushing and one or more load-carrying links, and by allowing reduced load through the pin. Further, in a traditional roller chain, all of the tensile loads must go through the pin, and pin strength limitations can limit the load carrying capability of the chain. A chain of the present invention provides increased strength by reducing pin bending stress and transmitting a portion of the tensile force through the O.D. of the bushing to the load-carrying links. The present invention further improves on a roller chain by reducing noise by providing some links with inverted tooth link profiles that mesh with a silent chain type sprocket tooth profile.

It is noted that the present invention also contemplates a double-meshing-type silent chain capable of meshing with sprockets or toothed pulleys, which are mounted on respective driven shafts located inside and outside the chain. For example a double-meshing-type silent chain is used as a timing chain for transmitting rotational motion from the crankshaft of an engine to the camshaft of the engine or to the shaft of an auxiliary device such as an oil pump. As can be appreciated, a double-meshing-type silent chain is employed, when driven shafts located inside and outside the chain are rotated in opposite directions.

FIG. 9 through FIG. 14 show additional embodiments of the present invention, which are wider, stronger chains and are comparable to a double row roller chain. These variants are appropriate for cases where higher strength is required for the chain. Any of these chain lacings may be appropriate for a specific chain design, depending on the requirements of that design. Other variations are possible. In all of the variants shown, different quantities or thicknesses of links are substituted in any position, as necessary to obtain the required strength and width.

Figure 9A:
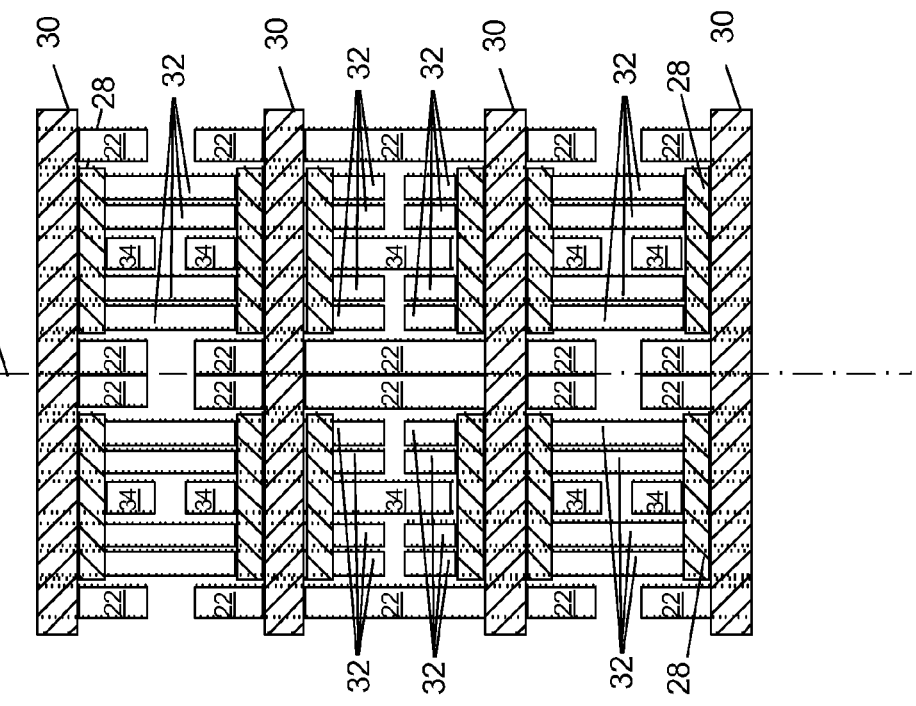
FIG. 9A shows a cross-sectional view of a double-width version of FIG. 3.
Figure 9B:
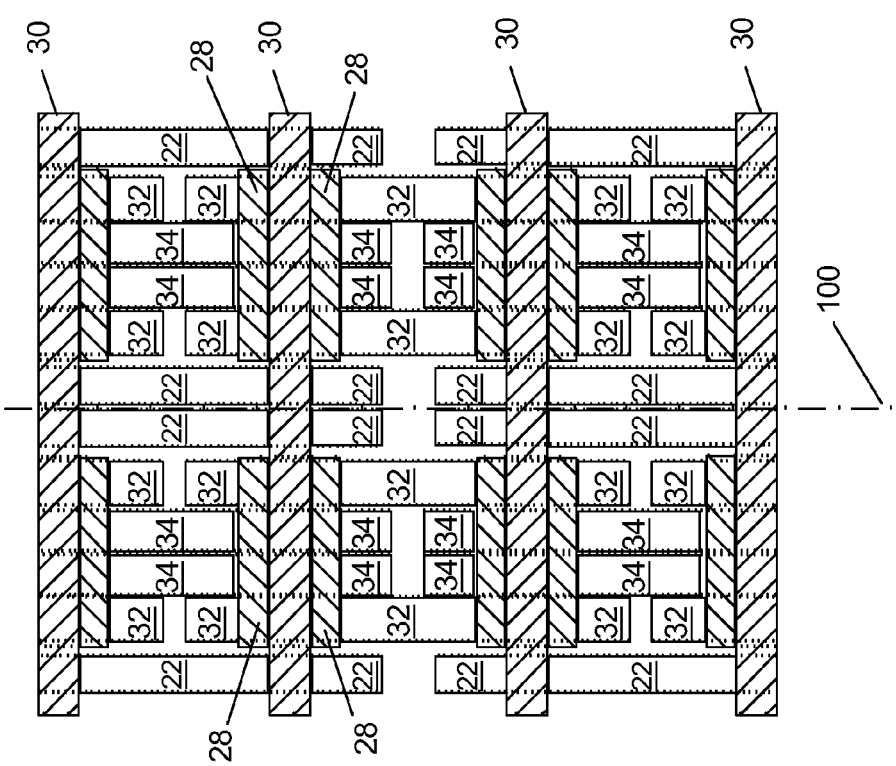
FIG. 9B shows a cross-sectional view of a variation of FIG. 9A.

In FIG. 9A, the "guide" links (22) do not engage the sprocket teeth. The inside links (32) and (34) are of the inverted tooth type and engage the sprocket teeth. Some of these inside links (32) are in the non-guide row, and the other links (34) are in the guide row of the chain. The pins (30) extend through the width of the chain, and the two bushings (28) are mounted on each pin (30). This embodiment is essentially a double row, or double width version of the embodiment shown in FIG. 3. This type of "double row" lacing is where higher strength is required, than can be achieved with a "single row" design. FIG. 9B is the same as FIG. 9A, except pairs of thinner inside links (32) are used rather than the thicker links (32) shown in FIG. 9A.

Figure 10:
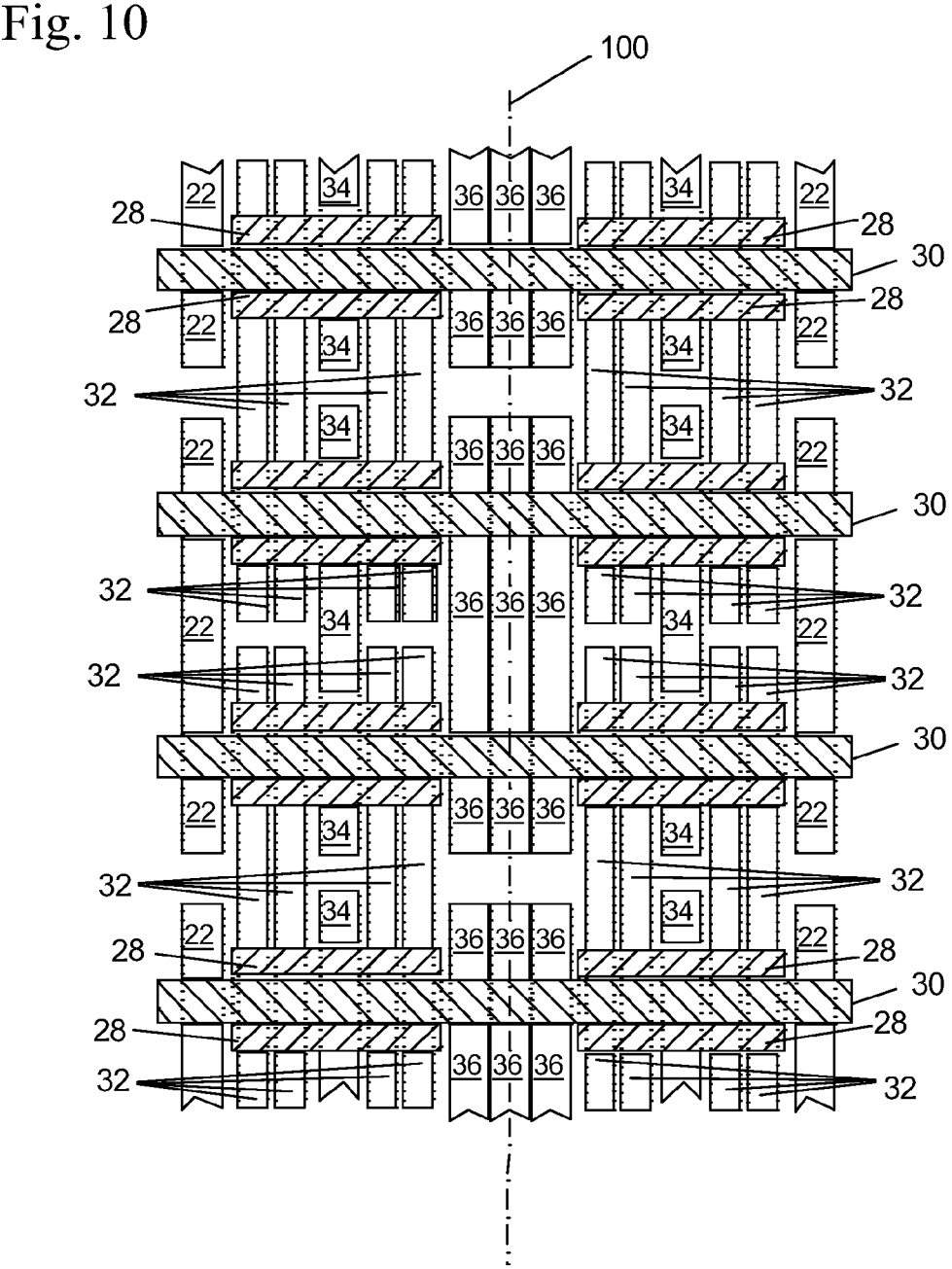
FIG. 10 shows a cross-sectional view of an embodiment of the present invention with no guide links in the center of the chain lacing.

FIG. 10 shows a preferred embodiment, where there are no guide links (22) in the center of the chain lacing. The chain has non-guide row inside links (32), as in FIG. 9A. The chain also has guide row inside links (34), again as in FIG. 9A. The center links (36) are in the guide row, but are of the inverted tooth type. This design operates on simple sprockets, as the only guide links are on the outside of the chain. In this design, the non-guide row inside links (32) fit tightly over the O.D. of the bushings (28), the guide row inside links (34) are a loose fit over the O.D. of the bushings and articulate relative to the bushings (28), and the center links (36) fit over the pins (30). The center guide row inside links (36) may be press fit to the pin (30), or slip fit, depending on the specific design requirements. More or fewer of any of the inside links (32), (34), and (36) may be used, depending again on the specific design and performance requirements for the chain assembly.

Figure 11:
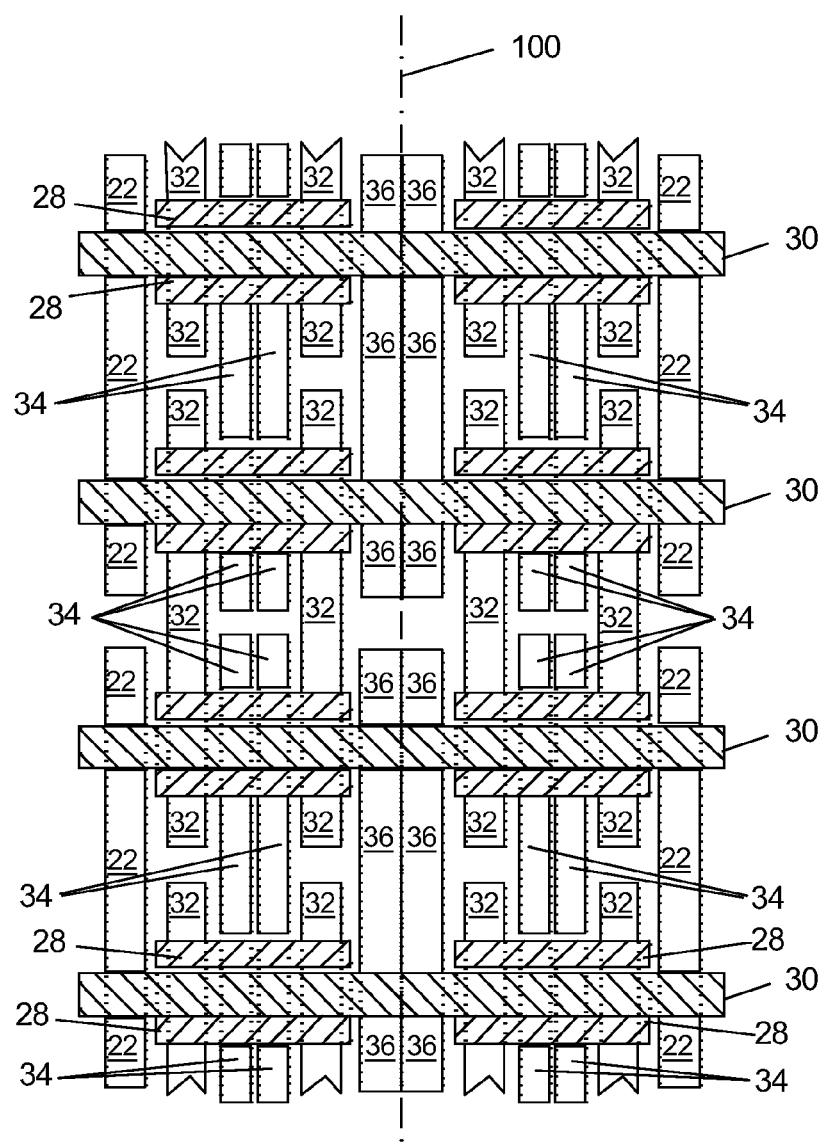
FIG. 11 shows a cross-sectional view of a variation of the embodiment of FIG. 10.

FIG. 11 shows a similar lacing to FIG. 10, with fewer center guide row inside links (36), and fewer non-guide row inside links (32).

Figure 12:
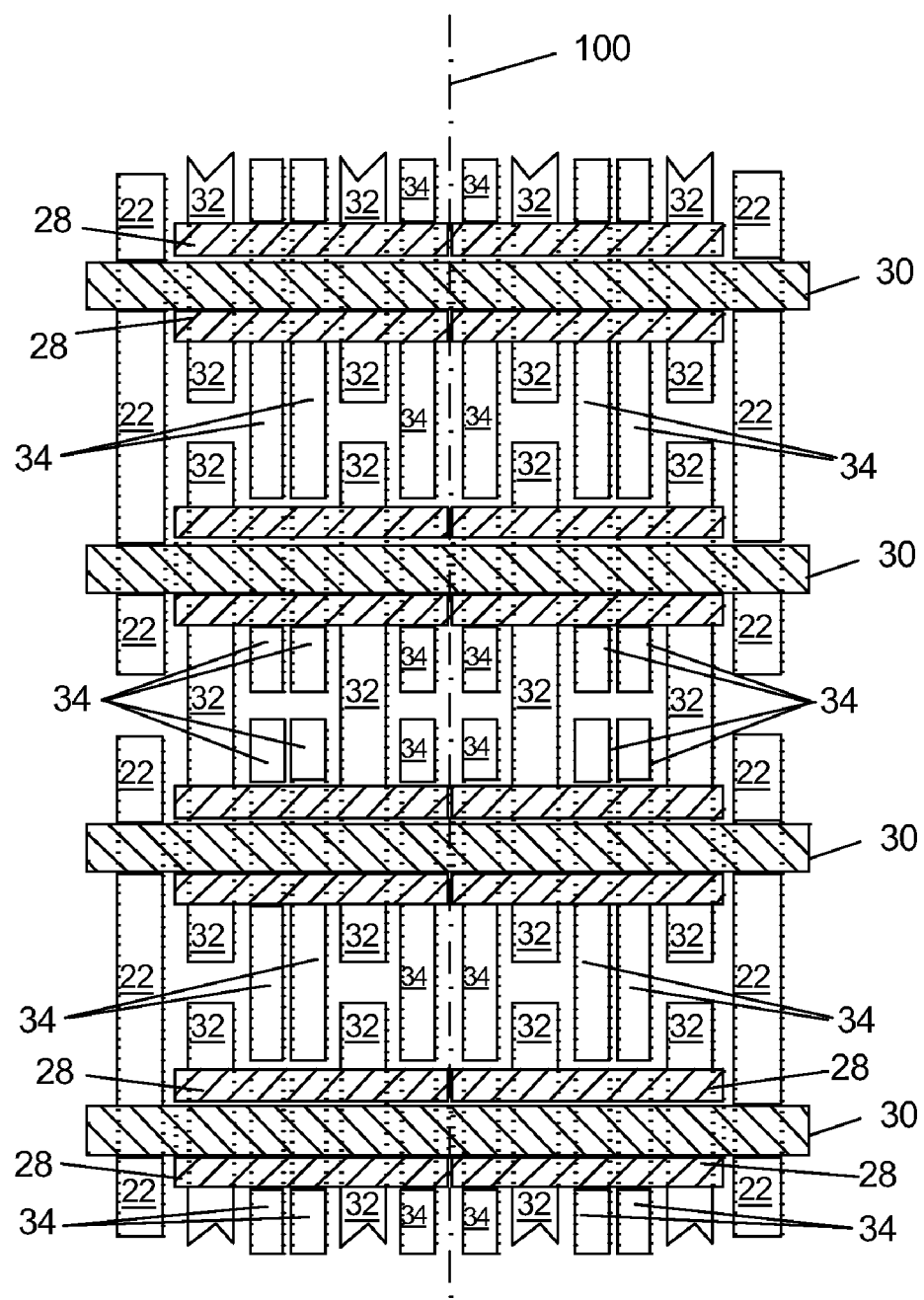
FIG. 12 shows a cross-sectional view of an embodiment made with fewer types of components.

FIG. 12 shows a lacing where the bushings (28) are cantilevered toward the center (100) of the lacing. This design has an advantage over the embodiments shown in FIG. 9A through FIG. 11 in that only three different link types are required: guide links (22), non-guide row inside links (32), and guide row inside links (34). All of the guide row inside links (34) fit over the O.D. of the bushing (28), which provides additional bearing area for wear resistance. This variant provides the most bearing area for a given chain width. Again, the number of links vary as required for any specific design.

In the final set of embodiments of the present invention, the transverse load-bearing elements include projections, which are attached to the non-guide row inside links. These embodiments do not have bushings as separate elements.

Figure 13A:
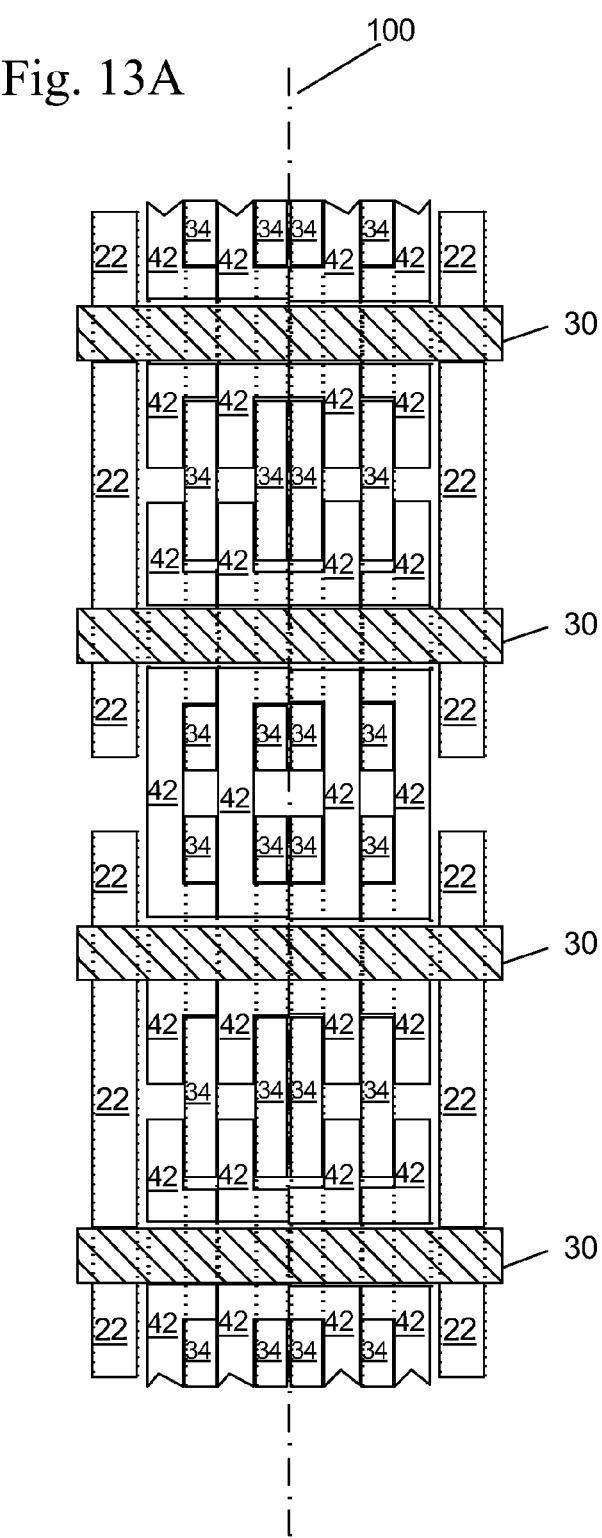
FIG. 13A shows a cross-sectional view of an embodiment of the present invention with no bushings.
Figure 13B:
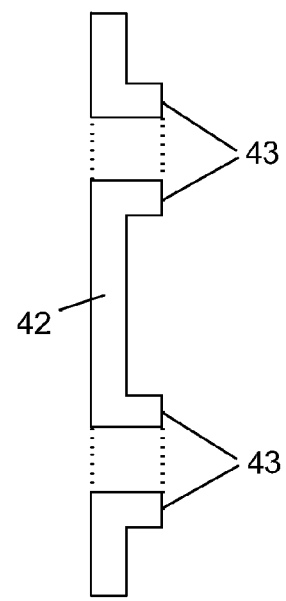
FIG. 13B shows a cross-sectional view of a non-guide row inside link of FIG. 13A with the projections going to the right.
Figure 13C:
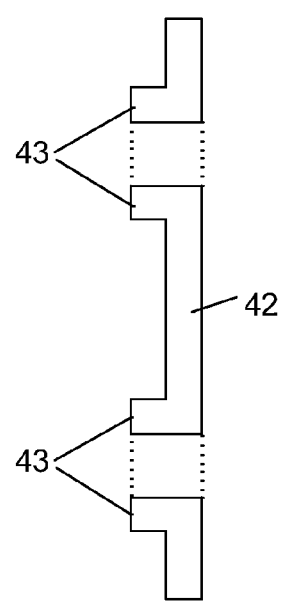
FIG. 13C shows a cross-sectional view of a non-guide row inside link of FIG. 13A with the projections going to the left.

FIG. 13A eliminates the bushing (28) as a separate component, and provides the function of the bushing (28) by providing projections (43) on the inside links (42). The link projections (43) are more easily seen in FIG. 13B and FIG. 13C. This is an improvement over Saitou (U.S. Pat. No. 6,540,911) because both the inside diameter and the outside diameter of the projection (43) are used for bearing area. All of the same benefits of using both the bushing (28) O.D. and I.D. for bearing area apply to this embodiment, except the projections (43) are providing the function of the bushing (28). Each of the non-guide row inside links (42) can be oriented in either direction, as shown in FIG. 13B and FIG. 13C.

Figure 14:
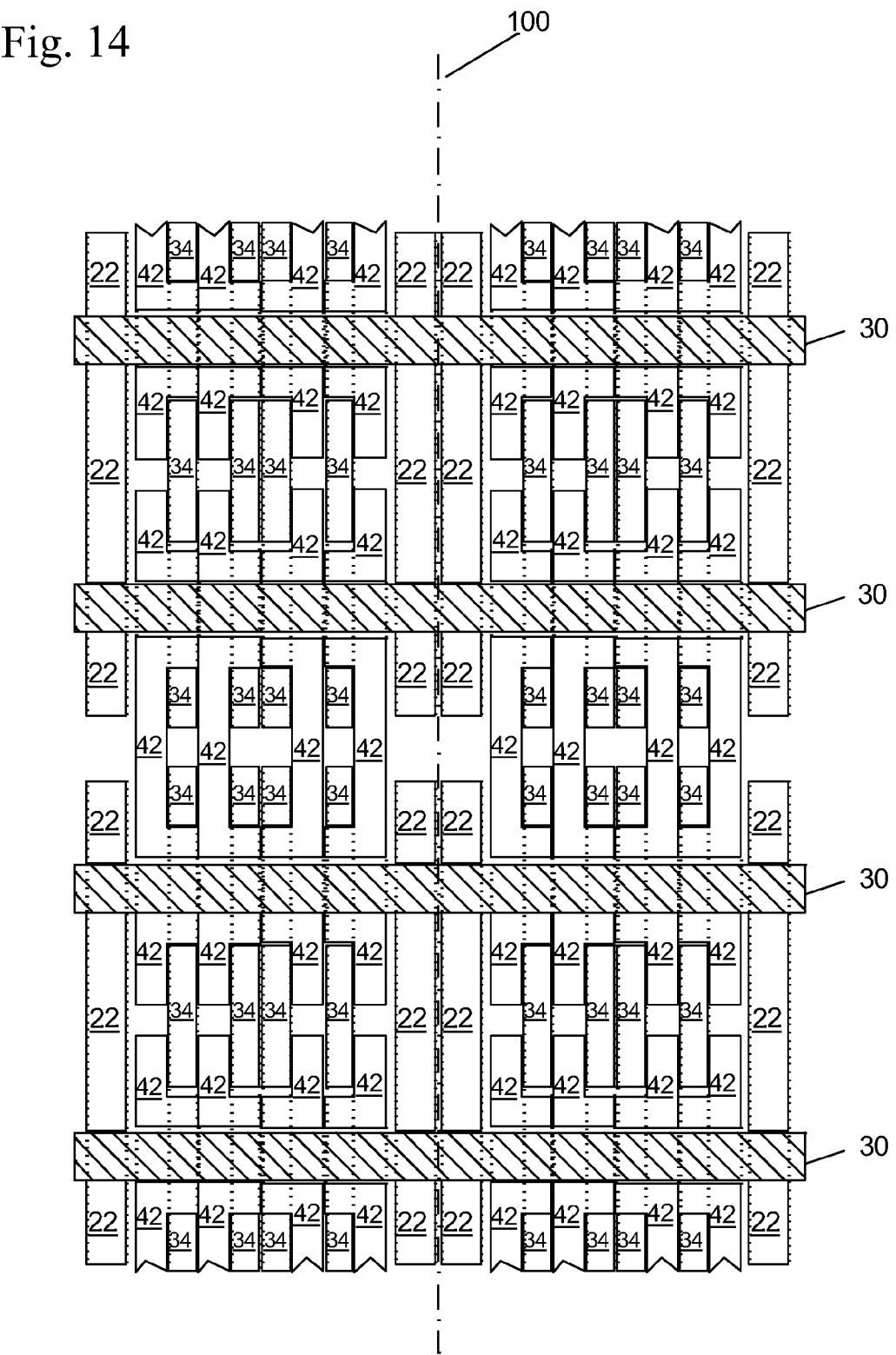
FIG. 14 shows a cross-sectional view of a double-width version of FIG. 13.

FIG. 14 shows a "double row" lacing of the variant shown in 13A. The center guide links (22) shown in this embodiment could also be replaced by inside links (36), similar to the change made from FIG. 9A to FIG. 10.

In summary, the present invention provides a wider, stronger chain. In one embodiment, the chain has guide links in the center of the lacing. In another embodiment of the present invention, the chain has inside links in the center of the lacing. In an embodiment of the present invention, cantilevered bushings are used that are non-symmetrical relative to the links that are press fit over the bushing O.D. Finally, the concept of using link projections to replace bushings, while still utilizing both the projection I.D. and O.D. for bearing area to resist wear, is shown.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain comprising a plurality of parallel links articulately connected together in rows along a direction of travel, comprising:

a plurality of first links, a plurality of second links, and a plurality of outside links, each of the first links, second links, and outside links having a body, a pair of apertures having an aperture diameter and an aperture inside surface;

a plurality of transverse load-bearing elements, each element comprising a pair of projections, each projection extending laterally from the first link body at each first link aperture with an inside projection diameter and an outside projection diameter, wherein the inside projection diameter and the outside projection diameter are used for bearing area;

a plurality of cylindrical pins having an outer surface and an outer diameter, passing through the apertures of the outside links, at least one first link bearing the transverse load-bearing elements and at least one second link, and having a bearing area for contact between the outer surface of the pin and the transverse load-bearing elements, such that the outer surface of the pin can move relative to the transverse load-bearing elements and carries load from the transverse load-bearing elements;

the links being arranged in rows, alternating between a first row comprising at least one first link and a second row comprising at least one second link and at least one outside link on each edge of the chain;

the diameter of the apertures of the second links being larger than the diameter of the apertures of the first links, and having a bearing area for contact between the outer surface of the transverse load-bearing elements and the inner surface of the apertures, such that the outer surface of the transverse load-bearing elements can move relative to the inside surface of the apertures of the second links and carries chain load;

the outside diameter of the pins being press-fit into the apertures of the outside links;

such that the chain is made up of alternating first rows of first links rigidly affixed to the transverse load-bearing elements and second rows of second links movable on the transverse load-bearing elements and outside links affixed to the pins.

2. The chain of claim 1, wherein each pin passes though links in a sequential order of an outside link, at least one first link, at least one second link, at least one first link, at least one second link, at least one first link, at least one second link, at least one first link, and an outside link.

3. The chain of claim 1, wherein each pin passes though links in a sequential order of an outside link, at least one first link, at least one second link, at least one first link, at least one second link, at least one first link, at least one second link, at least one first link, at least one outside link, at least one first link, at least one second link, at least one first link, at least one second link, at least one first link, at least one second, at least one first link, and an outside link.

4. The chain of claim 1, further comprising at least one third link.

5. The chain of claim 4, wherein each pin passes though links in a sequential order of an outside link, at least one first link, at least one second link, at least one first link, at least one second link, at least one first link, at least one second link, at least one first link, at least one third link, at least one first link, at least one second link, at least one first link, at least one second link, at least one first link, at least one second link, at least one first link, and an outside link.

6. The chain of claim 5, wherein the at least one third link is positioned along a center line of the chain.

7. The chain of claim 4, wherein the third links are inverted-tooth links.

8. The chain of claim 1, wherein the second links are positioned along a center line of the chain.

9. The chain of claim 8, wherein the second links are non-inverted center guide links.

10. The chain of claim 1, wherein the second links are inverted-tooth links.

11. The chain of claim 1, wherein the outside links are inverted-tooth links.

12. The chain of claim 1, wherein the outside links are guide links.

13. The chain of claim 1, wherein the first links are inverted-tooth links.

\* \* \* \* \*